US008358428B2

(12) United States Patent
Inada

(10) Patent No.: US 8,358,428 B2
(45) Date of Patent: Jan. 22, 2013

(54) IMAGE PROCESSING METHOD

(75) Inventor: Hajime Inada, Chiryu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1097 days.

(21) Appl. No.: 12/053,719

(22) Filed: Mar. 24, 2008

(65) Prior Publication Data
US 2008/0239377 A1    Oct. 2, 2008

(30) Foreign Application Priority Data

Mar. 28, 2007   (JP) ................................. 2007-084861

(51) Int. Cl.
*G06F 3/12*       (2006.01)
*G06K 15/00*      (2006.01)
(52) U.S. Cl. ...................... 358/1.15; 358/1.13; 358/1.14
(58) Field of Classification Search ................. 358/1.13, 358/1.14, 1.1, 1.2, 1.6, 1.9, 1.15, 1.16, 1.17, 358/1.18, 474, 468, 407, 437, 404, 444; 347/2, 347/3, 5, 14, 23; 399/1, 8, 9, 18; 719/321, 719/327
See application file for complete search history.

(56) References Cited

U.S. PATENT DOCUMENTS

| 7,293,114 B2* | 11/2007 | Yashiki et al. .................... 710/5 |
| 2005/0141013 A1* | 6/2005 | Kikuchi et al. ............... 358/1.14 |
| 2006/0037457 A1 | 2/2006 | Yanase et al. |
| 2006/0139675 A1* | 6/2006 | Lee et al. ..................... 358/1.13 |
| 2006/0168236 A1 | 7/2006 | Higuma et al. |
| 2008/0141284 A1 | 6/2008 | Tomizu |

FOREIGN PATENT DOCUMENTS

| JP | H08-044637 A | 2/1996 |
| JP | H09-305523 A | 11/1997 |
| JP | 2003-256348 A | 9/2003 |
| JP | 2004213421 A | 7/2004 |
| JP | 2004-265301 A | 9/2004 |
| JP | 2005-321907 A | 11/2005 |
| JP | 2006-047831 A | 2/2006 |
| WO | 2004-032425 A1 | 4/2004 |

OTHER PUBLICATIONS

Japan Patent Office, Office Action in Japanese Patent Application No. 2007-084861 (counterpart of the above-captioned U.S. Patent Application) mailed Jan. 7, 2009.

* cited by examiner

Primary Examiner — Dov Popovici
(74) Attorney, Agent, or Firm — Baker Botts L.L.P.

(57) ABSTRACT

An image processing method controls a computer and an image processing device connected to the computer to perform an image processing. The computer includes a plurality of drivers that controls the image processing device. The image processing method includes (a) controlling the image processing device by using one of the plurality of drivers, (b) storing, in a storing unit, error information indicating which one of the plurality of drivers is used when an error is occurred in the controlling step (a), (c) accessing to the error information stored in the storing step (b), (d) selecting a subject driver from the plurality of drivers based on the error information accessed in the accessing step (c), and (e) controlling the image processing device via the subject driver selected in the selecting step (d).

20 Claims, 5 Drawing Sheets

FIG.2
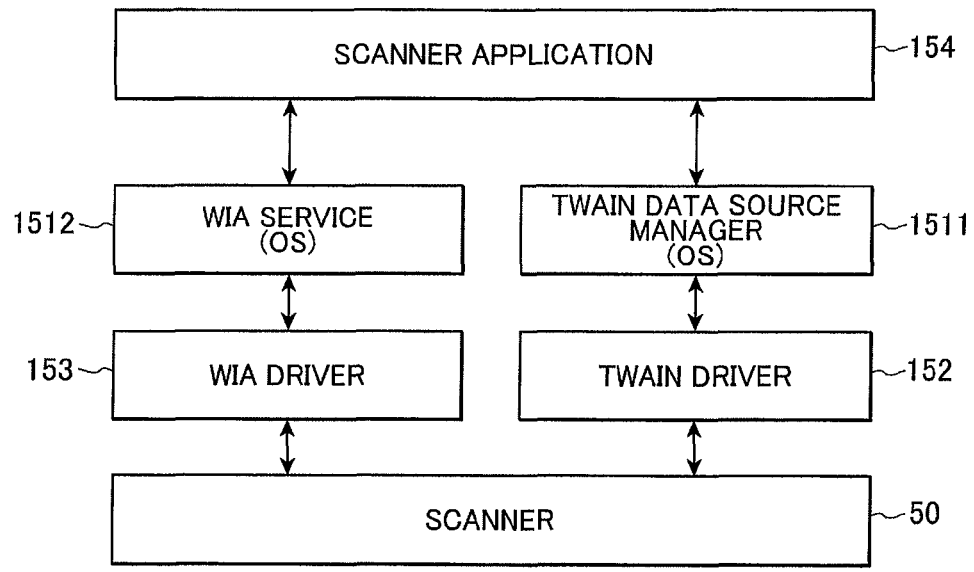
FIG.3
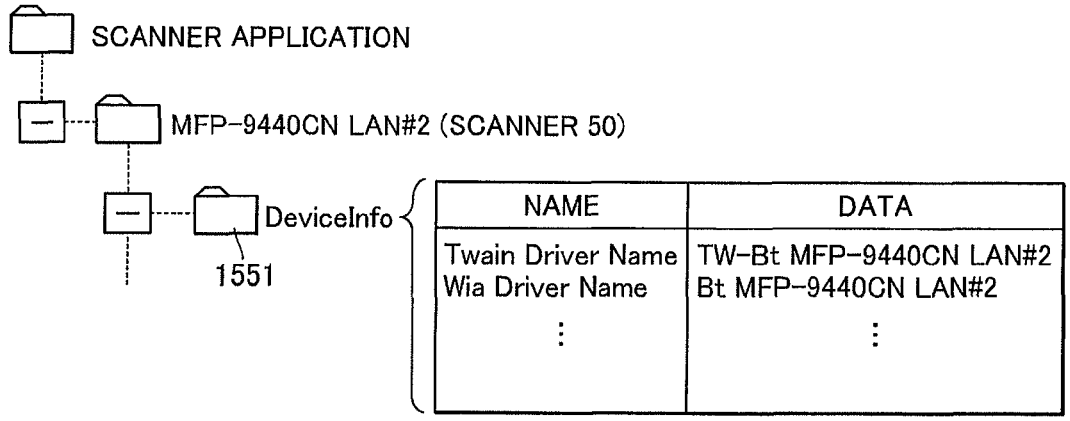
FIG.4
[Error] [Twain] [MFP-240CN USB]   Twain I/F Error !
[Error] [Twain] [TW-Bt MFP-9440CN LAN#2]   Twain I/F Error !

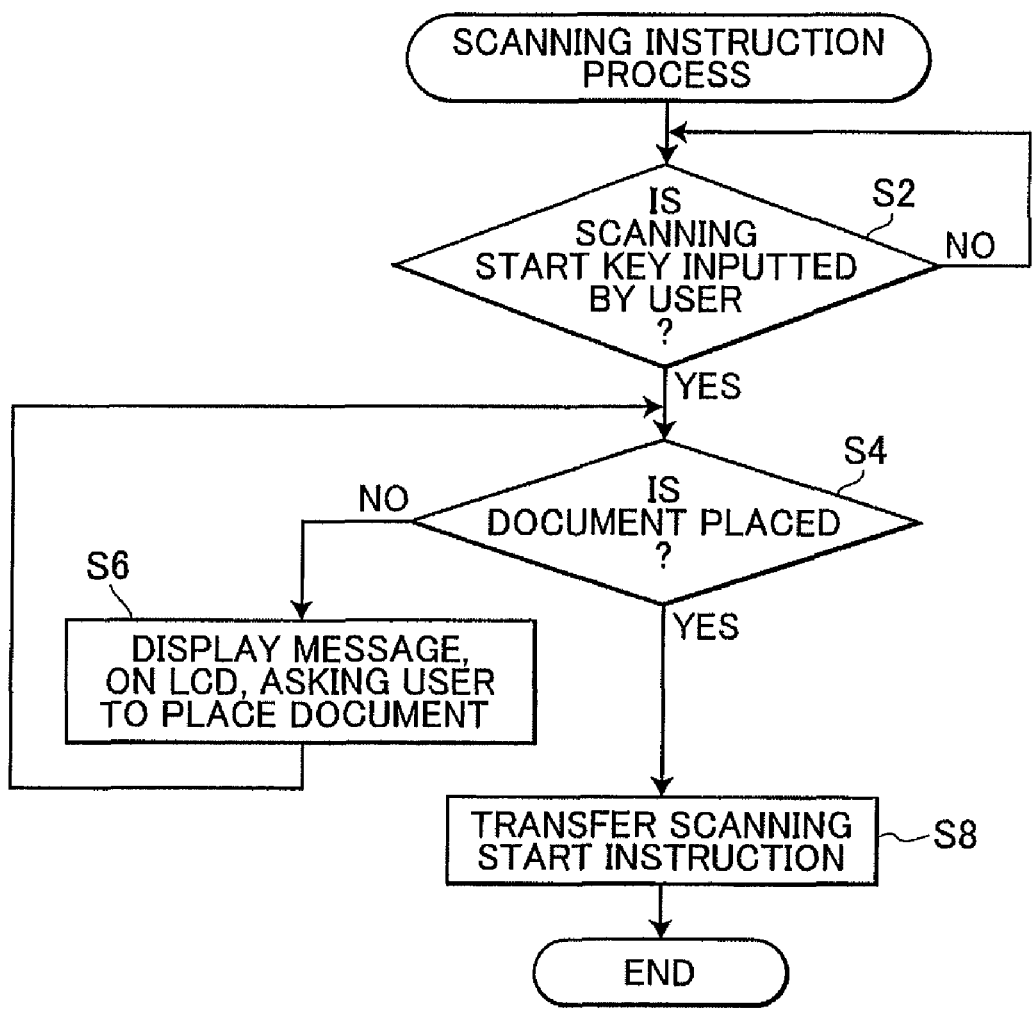

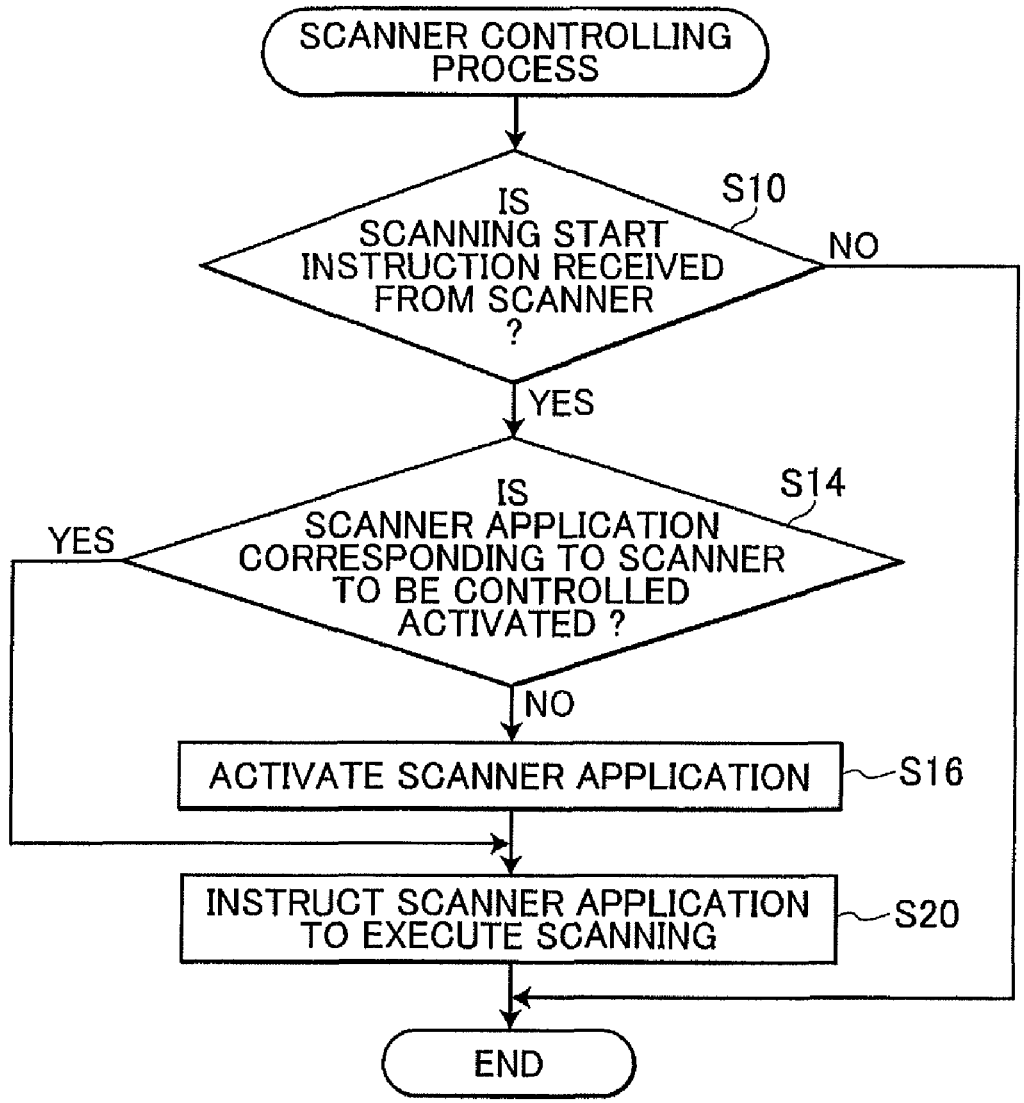

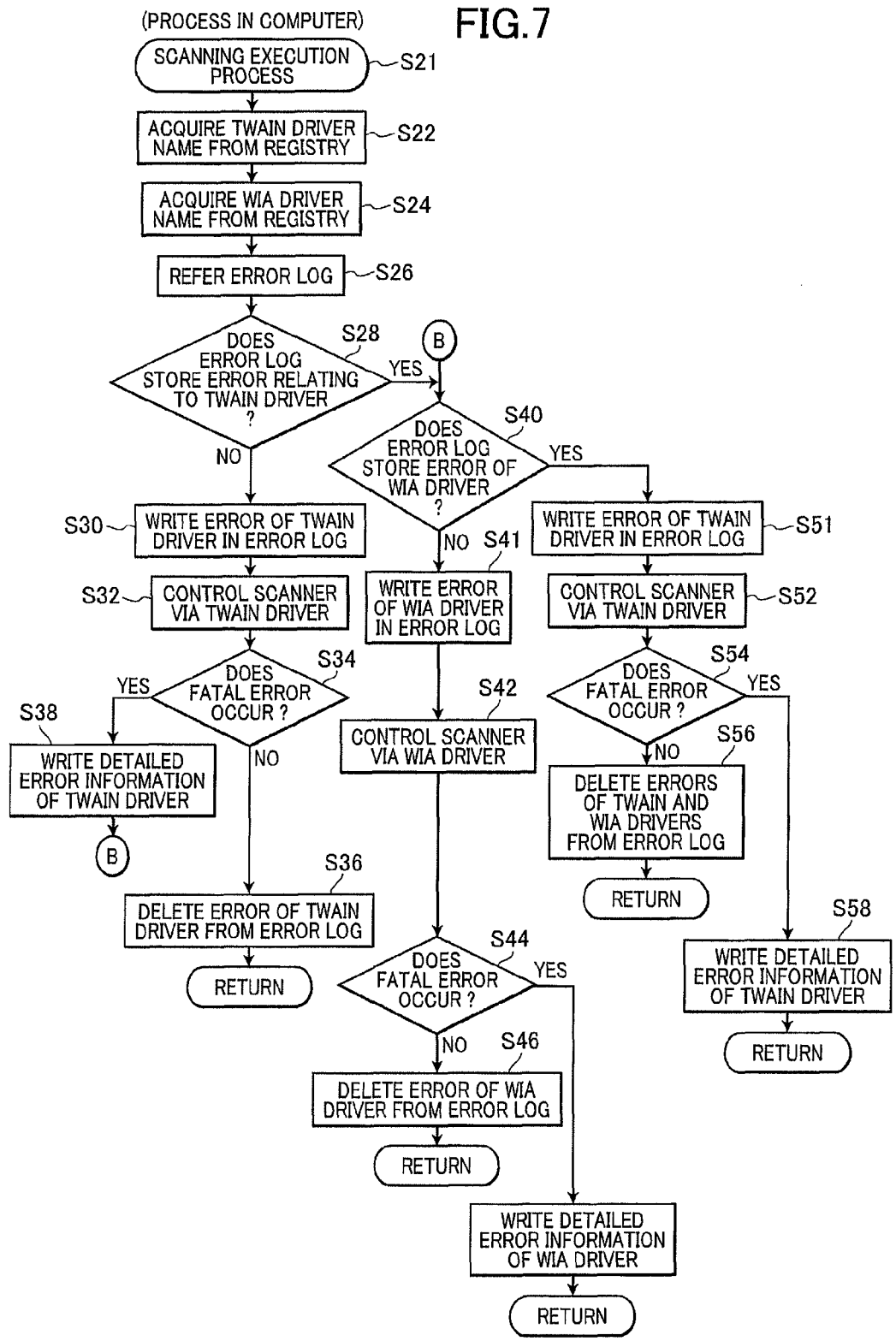

_US 8,358,428 B2_

IMAGE PROCESSING METHOD

CROSS REFERENCE TO RELATED APPLICATION

This application claims priority from Japanese Patent Application No. 2007-084861 filed Mar. 28, 2007. The entire content of this priority application is incorporated herein by reference.

TECHNICAL FIELD

The present invention relates to an image processing method, and an image processing program. More particularly, to an image processing method capable of reducing work of the user by selecting an appropriate driver automatically even when there are a plurality of drivers for controlling an image processing device.

BACKGROUND

In a usual scanner device, a vendor of the scanner device usually provides two different drivers, such as, a TWAIN driver and a WIA driver, for the one scanner device. Japanese Patent Application Publication No. 2004-213421 discloses a personal computer (PC) that is installed a plurality of scanner drivers for one scanner device.

SUMMARY

When the two drivers are installed in an OS equipped in a PC in order to use a product, an application can arbitrary use either of the two drivers to command one scanner device to carry out scanning.

In case the user operates an operation panel of the scanner to control the scanner to request the PC to start scanning, a scanner application on a PC side which has received the request can use either of the TWAIN driver or the WIA driver to instruct the scanner to carry out scanning.

An object of the present invention is to provide an image processing program capable of reducing work of the user by selecting an appropriate driver automatically even in case there are a plurality of drivers for controlling an image processing device.

In order to attain the above and other objects, the invention provides an image processing method for controlling a computer and an image processing device connected to the computer to perform an image processing. The computer includes a plurality of drivers that controls the image processing device. The image processing method includes (a) controlling the image processing device by using one of the plurality of drivers, (b) storing, in a storing unit, error information indicating which one of the plurality of drivers is used when an error is occurred in the controlling step (a), (c) accessing to the error information stored in the storing step (b), (d) selecting a subject driver from the plurality of drivers based on the error information accessed in the accessing step (c), and (e) controlling the image processing device via the subject driver selected in the selecting step (d).

According to another aspects, the invention provides a computer-readable storage medium. The computer-readable storage medium stores a set of program instructions executable on a computer to control an image processing device that is connected to the computer. The computer includes a plurality of drivers that controls the image processing device. The program instructions includes (a) controlling the image processing device by using one of the plurality of drivers, (b) storing, in a storing unit, error information indicating which one of the plurality of drivers is used when an error is occurred in the controlling step (a), (c) accessing to the error information stored in the storing step (b), (d) selecting a subject driver from the plurality of drivers based on the error information accessed in the accessing step (c), and (e) controlling the image processing device via the subject driver selected in the selecting step (d).

BRIEF DESCRIPTION OF THE DRAWINGS

Embodiments in accordance with the invention will be described in detail with reference to the following figures wherein:

FIG. 2 is a block diagram showing a flow of data between the computer and the scanner;

FIG. 3 is a schematic diagram showing a configuration of a registry;

FIG. 4 is a diagram showing an example of errors stored in an error log;

FIG. 5 is a flowchart showing a scanning instruction process executed in the scanner;

FIG. 6 is a flowchart showing a scanner control process executed in the computer; and FIG. 7 is a flowchart showing a scanning execution process executed in the computer.

DETAILED DESCRIPTION

Figure 1:
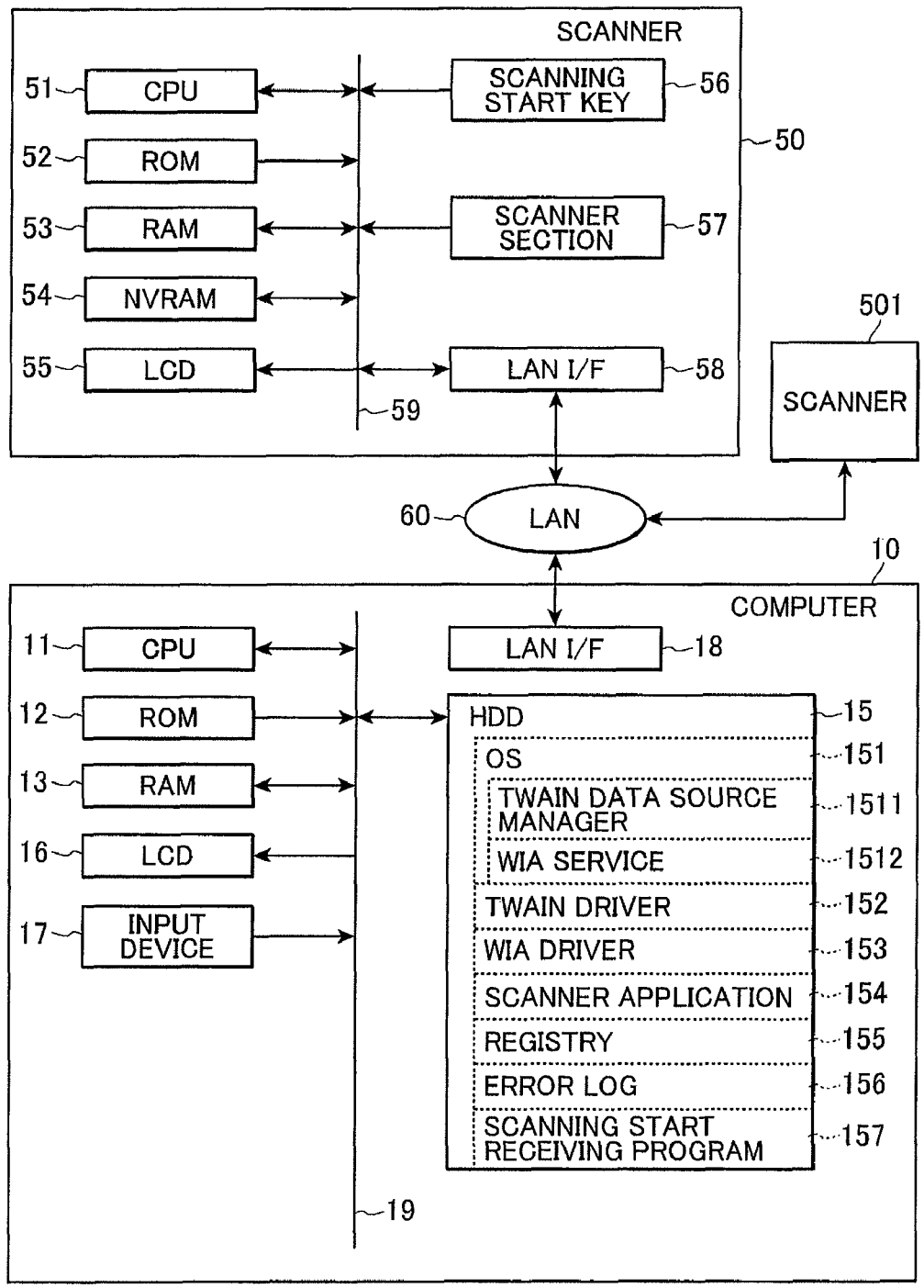
FIG. 1 is a block diagram showing an electrical configuration of a computer and a scanner.

An embodiment of the invention will be described while referring to the accompanying drawings. FIG. 1 is a block diagram showing an electrical configuration of a computer 10 and a scanner 50. A scanner application according to the embodiment of an image processing program of the invention is installed in the computer 10. The scanner 50 serves as one example of an image processing device connected to the computer 10. As shown in FIG. 1, the computer 10 and the scanner 50 are connected by a LAN 60.

In the embodiment, the computer 10 is connected to a plurality of scanners, including the scanner 50 and a scanner 501. However, for simplifying drawings and explanation, detailed description of FIG. 1 will be given only with respect to the scanner 50 connected to the computer 10 via the LAN 60.

The computer 10 includes a CPU 11, a ROM 12, a RAM 13, an HDD (Hard Disk Drive) 15, a liquid crystal display 16 (hereinafter referred to as the LCD 16), an input device 17, and a LAN interface 18, which are connected among each other by a system bus 19. Microsoft Windows (registered trademark) is installed and activated as an OS 151 in the computer 10.

The CPU 11 is a central processing unit for controlling the computer 10. The CPU 11 executes a variety of types of processing, such as processing (refer to FIGS. 6 and 7) for controlling the scanner 50.

The ROM 12 is a read-only storage device. A program for activating the OS of the computer 10 is stored in the ROM 12. The RAM 13 is a volatile storage device capable of reading and writing.

The HDD 15 is a storage device (hard disk) capable of reading and writing data and a reading device that reads data from the storage device. The HDD 15 stores an operating system 151 (hereinafter referred to as the OS 151), a TWAIN driver 152, a WIA driver 153, a scanner application 154, a registry 155, an error log 156, a scanning start receiving program 157, and raster data transferred from a scanner connected via the LAN 60, such as the scanner 50. In case models of the scanners connected to the computer 10 are different among each other, the TWAIN driver, the WIA driver, the scanner application, and the scanning start receiving program corresponding to each of the models are stored in the HDD 15. In the embodiment, as shown in FIG. 1, only the TWAIN driver 152, the WIA driver 153, the scanner application 154, and the scanning start receiving program 157 corresponding to the scanner 50 are drawn and described.

As shown in FIG. 1, the OS 151 includes a TWAIN data source manager 1511 and a WIA service 1512. Here, both "TWAIN" and "WIA" are standards used in a process for transferring data to the computer 10 from an image processing device, such as a scanner and a digital camera. The OS 151 installed in the computer 10 of the embodiment includes the TWAIN data source manager 1511 for managing the TWAIN driver 152 corresponding to the TWAIN standard and the WIA service 1512 for managing the WIA driver 153 corresponding to the WIA standard. Accordingly, the OS 151 is compatible with both the standards (the TWAIN standard and the WIA standard).

With reference to FIG. 2, a flow of data in communication between the computer 10 and the scanner 50 will be described. FIG. 2 is a block diagram showing the flow of data between the computer 10 and the scanner 50. In the communication between the computer 10 and the scanner 50, data is exchanged via either of the TWAIN driver 152 or the WIA driver 153.

The TWAIN data source manager 1511 is a program for managing the TWAIN driver 152. The TWAIN data source manager 1511 exchanges instructions and data with the scanner application 154. Respond to access from the scanner application 154, the TWAIN data source manager 1511 returns a driver name which is identification information of the TWAIN driver 152 to the scanner application 154, so that the TWAIN driver 152 can be selected by the CPU 11.

The WIA service 1512 is a program for managing the WIA driver 153. The WIA service 1512 exchanges instructions and data with the scanner application 154. Respond to access from the scanner application 154, the WIA service 1512 returns a driver name which is identification information of the WIA driver 153 to the scanner application 154, so that the WIA driver 153 can be selected by the CPU 11.

The TWAIN driver 152 communicates with a communication port (for example, the LAN interface 18) connected to the scanner 50. The TWAIN driver 152 receives raster data sent from the scanner 50, and transfers the received raster data to the scanner application 154. The TWAIN driver 152 configures driver software of the scanner 50.

The WIA driver 153 communicates with a communication port (for example, the LAN interface 18) connected to the scanner 50. The WIA driver 153 receives raster data sent from the scanner 50, and transfers the received raster data to the scanner application 154. The WIA driver 153 configures driver software of the scanner 50.

The TWAIN driver 152 and the WIA driver 153 are the drivers for controlling the scanner 50. The TWAIN driver 152 and the WIA driver 153 are different from each other with respect to a point that the TWAIN driver 152 complies with the TWAIN standard to control the scanner 50, whereas the WIA driver 153 complies with the WIA standard to control the scanner 50. The TWAIN driver 152 and the WIA driver 153 are linked with the OS 151 in procedures different from each other to control the scanner 50. That is, the TWAIN driver 152 and the WIA driver 153 are linked with the OS 151 in respective procedures.

In the embodiment, communication between the computer 10 and the scanner 50 is carried out via one of the drivers. Even when one of the drivers has a problem and is not capable of communicating with the scanner 50, the scanner 50 may be normally controlled by carrying out communication via remaining driver. Thus, in the embodiment, one of the TWAIN driver 152 and the WIA driver 153 which has higher possibility for controlling the scanner 50 in a normal manner is automatically selected, and the scanner 50 is controlled by using the selected driver. That is, one of the TWAIN driver 152 and the WIA driver 153 is automatically selected such that the scanner is properly controlled with higher possibility. Details of this configuration will be described later with reference to FIG. 7.

The scanner application 154 runs on the computer 10 compatible with the TWAIN driver 152 and the WIA driver 153. The scanner application 154 is installed in the computer 10 by the user. In addition, the scanner application 154 receives raster data from the TWAIN driver 152 or the WIA driver 153. A scanning execution process (refer to FIG. 7) described later is executed in accordance with the scanner application 154.

As shown in FIG. 1, the registry 155 is a database that centrally manages, all setting information, with respect to the computer 10, including device driver setting and application setting, on Microsoft Windows (registered trademark) as the OS.

With reference to FIG. 3, setting information managed by the registry 155 will be described. FIG. 3 is a view schematically showing a configuration of the registry 155. As shown in FIG. 3, the registry 155 has a hierarchical tree structure. The registry 155 stores a corresponding relationship between the scanner 50 and a driver used for controlling the scanner 50. More specifically, the registry 155 is provided with a device information region 1551 for the scanner 50. The device information region 1551 stores a driver name of the TWAIN driver 152 corresponding to the scanner 50, and a driver name of the WIA driver 153 corresponding to the scanner 50.

More specifically, the registry 155 stores a name "TwainDriverName" indicative of the TWAIN driver 152, and data (value) "TW-Bt MFP-9440CN LAN#2" as a driver name corresponding to the name "TwainDriverName". In addition, the registry 155 stores a name "WiaDriverName" indicative of the WIA driver 153, and data (value) "Bt MFP-9440CN LAN#2" as a driver name corresponding to the name "WiaDriverName". As will be described in the scanning execution process (refer to FIG. 7) described later, the driver name ("TW-Bt MFP-9440CN LAN#2", "Bt MFP-9440CN LAN#2") of the TWAIN driver 152 or the WIA driver 153 corresponding to the scanner 50 is acquired by setting the name "TwainDriverName" or "WiaDriverName" stored in the registry 155 as a retrieval key.

In a case where a plurality of scanners, which are different models among each other, are connected to the computer 10. The TWAIN driver and the WIA driver for each of the models are installed in the computer 10. In this case, the device information region corresponding to each of the models is provided in the registry 155, and the TWAIN driver name and the WIA driver name are stored in each of the device information regions.

As shown in FIG. 1, the error log 156 is a file that is for storing a history of fatal errors generated during an operation of each of the TWAIN driver 152 and the WIA driver 153. In other words, the error log 156 stores information about the fatal error that has been occurred in a process for scanning, such as the scanning execution process, described later. The information about the error indicates which one of the plurality of drivers (the TWAIN driver, the WIA driver, for example) installed in the computer 10 is used when the fatal error is occurred in the process for scanning. In the embodiment, the fatal errors do not include errors that can be resolved by determination and handling of the user himself or herself, among errors that have occurred, such as nonexistence of a document, paper jam during the document (or paper) conveyance, a LAN cable being unplugged, power of a scanner being turned off, incorrect network setting of a scanner or a computer, and disconnection with destination equipment through a cable. Errors other than those described above are considered as fatal errors, and information about occurrence of such fatal errors is stored in the error log 156.

With reference to FIG. 4, the error log 156 will be described in detail. FIG. 4 is a diagram showing an example of errors stored in the error log 156. As shown in FIG. 4, the error log 156 stores driver information (Twain/Wia) and a driver name (for example, "TW-Bt MFP-9440CN LAN#2" or "Bt MFP-9440CN LAN#2") in relation to the driver information. More specifically, the driver information stored in the error log 156 indicates which driver is used in the occurrence of the error, the TWAIN driver or the WIA driver. The driver name stored in the error log 156 indicates the specific driver name that is used in the occurrence of the error. The error log 156 stores other detailed information, such as error occurrence time (not shown).

Description will be given with reference to FIG. 1 again. The scanning start receiving program 157 is a program that instructs the scanner application 154 to execute scanning when the user instructs start of scanning on the scanner 50. Scanning control processing executed by the scanning start receiving program 157 will be described later with reference to FIG. 6.

The LCD 16 is a display device that outputs and displays information. The LCD 16 is connected to the system bus 19 via an input/output interface (not shown). The LCD 16 is used for displaying information about various functions of the computer 10. A display of other configurations, such as a CRT (Cathode Ray Tube) display, for example, may be used in place of the LCD 16.

The input device 17 is configured with a mouse and a keyboard, for example. The input device 17 is connected to the system bus 19 via the input/output interface (not shown) for receiving an inputted operation from outside of the computer 10. The input device 17 is used for inputting information about various functions of the computer 10.

The LAN interface 18 is connected to a LAN interface 58 of the scanner 50 via the LAN 60. The LAN interface 18 enables data communication, which, for example, transfers raster data, between the computer 10 and the scanner 50.

As shown in FIG. 1, the scanner 50 includes a CPU 51, a ROM 52, a RAM 53, an NVRAM (Non Volatile RAM) 54, an LCD 55, a scanning start key 56, a scanner section 57, and the LAN interface (LAN I/F) 58, which are connected to each other by a system bus 59.

The CPU 51 is a central processing unit for controlling the scanner 50. The CPU 51 analyzes an instruction received from the computer 10, and executes processes, such as a process for providing a scanner function of the scanner section 57, which will be described later.

The ROM 52 is a read-only memory. The RAM 53 is a volatile storage device capable of reading and writing. The NVRAM 54 is a non-volatile RAM for saving data which needs to be rewritten.

The LCD 55 is a display device that outputs and displays information. The LCD 55 is connected to the system bus 59 via the input/output interface (not shown). The LCD 55 is used for displaying information about various functions of the scanner 50.

The scanning start key 56 is an input device provided on the scanner 50 for an input operation of the user with respect to the scanner 50. The scanning start key 56 is connected to the system bus 59 via the input/output interface (not shown). By pressing the scanning start key 56, notification is provided to the computer 10 connected via the LAN interface 60. The computer 10 receives the notification and controls the scanner 50. Then, in accordance with the notification, the scanner section 57 generates image data, and transfers the generated image data from the scanner 50 to the computer 10.

The scanner section 57 provides a scanner function for transferring an image drawn (printed) on paper or a film to a computer. The scanner section 57 is connected to the system bus 59 via the input/output interface (not shown). By an instruction, which will be described later, sent from the computer 10, the scanner section 57 executes, via the CPU 51, scanning of a document placed on a predetermined position of the scanner 50. Then, image data (raster data) generated based on such scanning is transferred to the scanner application 154 of the computer 10 via the TWAIN driver 152 or the WIA driver 153.

The LAN interface 58 is connected to the LAN interface 18 of the computer 10 via the LAN 60. The LAN interface 58 enables data communication, which, for example, transfers raster data, between the scanner 50 and the computer 10.

Referring to FIG. 5, description will be given with respect to a process executed in the scanner 50 and in the computer 10 for controlling the scanner 50. FIG. 5 is a flowchart showing a scanning instruction process executed in the scanner 50. The scanning instruction process is periodically executed after power of the scanner 50 is turned on.

First, in S2 the CPU 51 determines whether the user's input to the scanning start key 56 (FIG. 1) is detected. When the CPU 51 determines that the user's input to the scanning start key 56 is not detected (S2: No), the CPU 51 stands by the process.

On the other hand, when the CPU 51 determines that the user's input to the scanning start key 56 is detected (S2: Yes), in S4 the CPU 51 determines whether a document is placed on a prescribed document placing position of the scanner 50. When the CPU 51 determines that a document is not placed on a prescribed document placing position of the scanner 50 (S4: No), the CPU 51 controls the LCD 55 (FIG. 2) to display a message asking the user to place a document on the prescribed document placing position. Subsequently the CPU 41 returns to S4.

On the other hand, when the CPU 51 determines that a document is placed on the prescribed document placing position of the scanner 50 (S4: Yes), in S8 the CPU 51 transmits a scanning start instruction to the computer 10. Subsequently, the CPU 51 ends the process. A process of the computer 10, which has received the scanning start instruction, will be described with reference to FIG. 6. According to the scanning instruction process, the scanning starting instruction can notify the computer 10 of that the user has pressed the scanning start key 56.

FIG. 6 is a flowchart showing the scanner control process executed in the computer 10. The scanner control process shown in FIG. 6 is processing executed in the computer 10 in accordance with the scanning start receiving program 157.

First, in S10 the CPU 11 determines whether the scanning start instruction is received from the scanner 50. When the CPU 11 determines that the scanning start instruction is not received from the scanner 50 (S10: No), the CPU 11 ends the scanner control process.

On the other hand, when the CPU 11 determines that the scanning start instruction is received from the scanner 50 (S10: Yes), in S14 the CPU 11 determines whether a scanner application corresponding to a scanner to be controlled is activated. Here, a scanner, which is a source device of the scanning start instruction, corresponds to the scanner to be controlled. In the embodiment, the scanner to be controlled is the scanner 50. That is, the scanner 50 transmits the scanning start instruction to the CPU 11 of the computer 10. By receiving the scanning start instruction from the scanner 50, the CPU 11 controls the scanner 50.

When the CPU 11 determines that the scanner application 154 corresponding to the scanner 50 is not activated (S14: No), in S16 the CPU 11 activates the scanner application 154 corresponding to the scanner 50. Subsequently, in S20 the CPU 11 instructs the scanner application 154 to execute a scanning operation. On the other hand, when the CPU 11 determines that the scanner application 154 corresponding to the scanner 50 is activated (S14: Yes), the CPU 11 skips 916 and in S20 instructs the scanner application 154 to execute a scanning operation.

With reference to FIG. 7, the scanning execution process (S21) will be described. FIG. 7 is a flowchart showing the scanning execution process (S21) executed in accordance with the scanner application 154. The scanning execution process (S21) is executed when a scanning operation is instructed by the scanner control process described with reference to FIG. 6, or an instruction for starting scanning is input from the input device 17 of the computer 10.

In the following description, the scanner 50 is the scanner to be controlled. If the scanning execution process (S21) is activated by the scanner control process shown in FIG. 6 (S16), a scanner, which is a source device of a scanning start instruction, corresponds to the scanner to be controlled. In addition, if an instruction to start scanning is input from the input device 17, the scanner to be controlled corresponds one of a scanner selected by the user, a scanner which is predetermined as the scanner to be controlled in the computer 10, and a scanner selected by an application which controls overall a plurality of image processing devices including the scanner 50.

First, in S22 the CPU 11 acquires, from the registry 155 (FIG. 3), the TWAIN driver name corresponding to the scanner 50, which is the scanner to be controlled. In S24, the CPU 11 acquires the WIA driver name corresponding to the scanner 50 from the registry 155. For example, the CPU 11 acquires "TW-Bt MFP-9440CN LAN#2" as the name of the TWAIN driver from the registry 155, and acquires "Bt MFP-9440CN LAN#2" as the name of the WIA driver from the registry 155. The CPU 11 can selects, in subsequent processes, each of drivers by using the acquired TWAIN driver name and the acquired WIA driver name.

Next, in S26 the CPU 11 refers the error log 156 (FIG. 4). Then, in the following processing from S28 to S58, the CPU 11 selects either one of the TWAIN driver 152 and the WIA driver 153 based on information about an error stored in the error log 156, and the CPU 11 controls the scanner 50 via the selected driver.

In S28 the CPU 11 determines whether information about an error with respect to the TWAIN driver 152 of the scanner 50 is stored in the error log 156. More specifically, the CPU 11 determines whether the driver name of the TWAIN driver 152 is included in the error log 156.

When the CPU 11 determines that information about an error relating to the TWAIN driver 152 is not stored in the error log 156 (S28: No), in S32 the CPU 11 selects the TWAIN driver 152. More specifically, the CPU 11 reads the TWAIN driver 152 specified by the TWAIN driver name acquired in S22, and the CPU 11 controls the scanner 50 via the TWAIN driver 152. That is, the TWAIN driver 152 is used in priority to the WIA driver 153. In other words, the CPU 11 gives the TWAIN driver 152 priority in the embodiment. In the step S32, the computer 10 (the CPU 11) outputs an instruction to the scanner 50 via the TWAIN driver 152 and controls the scanner 50. In this manner, image data can be generated in the scanner section 57, and the generated image data can be transferred from the scanner 50 to the computer 10.

Before the step S32 that starts the control of the scanner 50, in S30 the CPU 11 writes information about an error relating to the TWAIN driver 152 in the error log 156. Accordingly, the CPU 11 can surely store, in the error log 156, a record of an error relating to the TWAIN driver 152 even if an error occurs during the scanner 50 is controlled in S32 so that the computer 10 is in a state of not receiving input. In other words, the information about the error stored in S30 indicates the error to be occurred in S32. That is, the information about the error is stored in advance. The error stored in S30 in the error log 156 saved even if the error occurred during the control of the scanner in S32 so that the computer 10 cannot continue the scanning executing process anymore. Thus, the error log 156 correctly stores that the error has occurred during the control of the scanner via the TWAIN driver 152. As described later, if the error does not occur during the control of the scanner in S32, in S36 information about the error stored in S30 is deleted.

In S34 the CPU 11 determines whether a fatal error has occurred during the control of the scanner 50 by using the TWAIN driver 152.

Specific description for determining steps in which the CPU 11 determines whether a fatal error has occurred will be given below as an example. The CPU 11 determines whether an error has occurred during the control of the scanner 50 by the TWAIN driver 152. If an error has occurred, the CPU 11 determines whether the error has occurred due to any of nonexistence of document paper, paper jam of a document, pulling out of a cable, power of a scanner being turned off, incorrect network setting of a scanner or a computer, and disconnection with destination equipment through a cable. Then, if the error does not fall within any of the above, the CPU 11 determines that the error is a fatal error. Accordingly, an error which cannot be easily resolved by the user himself or herself, such as failure of loading a driver, lack of an OS file, garbling of data, incompatibility between an OS and a driver, conflict between drivers, and failure at installing a driver, can be determined as a fatal error.

When the CPU 11 determines that a fatal error has not occurred as a result of determination (S34: No), in S36 the CPU 11 deletes, from the error log 156, information about the error stored in the process S30 that precedes the start of the control of the scanner 50. Subsequently, the CPU 11 ends the process. If an error, which is not a fatal error, occurs during the control of the scanner 50, and if the control cannot be normally terminated, the LCD 16 of the computer 10 may display that the control has been terminated in an abnormal manner.

On the other hand, when the CPU 11 determines that a fatal error has occurred (S34: Yes), in S38 the CPU 11 writes detailed error information such as occurrence time of the error in addition to the error written in the error log 156 in the process S30 which precedes to the start of the control of the scanner 50. Subsequently, the CPU 11 proceeds to S40. In this manner, occurrence of a fatal error can be recorded in the error log 156.

The CPU 11 executes the step S40 when the CPU 11 determines that a fatal error has occurred during the control via the TWAIN driver 152 as described above (S34: Yes), or when the CPU 11 determines that information about an error relating to the TWAIN driver 152 is stored in the error log 156 (S28: Yes).

In S40 the CPU 11 determines whether information about an error relating to the WIA driver 153 of the scanner 50 is stored in the error log 156. More specifically, the CPU 11 determines whether a driver name of the WIA driver 153 is written in the error log 156.

When the CPU 11 determines that information about an error relating to the WIA driver 153 is not stored in the error log 156 (S40: No), in S42 the CPU 11 selects the WIA driver 153. That is, the CPU 11 reads the WIA driver 153 specified by the WIA driver name acquired in the step S24, and the CPU 11 controls the scanner 50 via the WIA driver 153 being read.

As described above, when information about an error with respect to the TWAIN driver 152 is stored in the error log 156 and when an error with respect to the WIA driver 153 is not stored in the error log 156, the CPU 11 automatically can select the WIA driver 153 that has higher possibility for a regular operating. Accordingly, this structure can save the user's effort. That is, in case information about an error relating to the TWAIN driver 152 is stored in the error log 156 as described above, an occurrence of an abnormality, such as failure in installation, is estimated with respect to the TWAIN driver 152. Thus, if information about an error relating to the TWAIN driver 152 is stored in the error log 156 and if information about an error relating to the WIA driver 153 is not stored in the error log 156, the WIA driver 153 can be determined to have higher possibility for a normal operation than the TWAIN driver 152.

In addition, in case the CPU 11 determines that a fatal error has occurred during the control of the scanner 50 via the TWAIN driver 152 (S34: Yes), in S42 the CPU 11 selects the WIA driver 153 and controls the scanner 50 by the WIA driver 153. In other words, even if an error occurs during the control of the scanner 50 by the TWAIN driver 152, drivers can be switched automatically. Accordingly, the user does not need to operate to switch the drivers himself or herself, and work of the user can be reduced.

Before the step S42 that starts the control of the scanner 50, in S41 the CPU 11 writes an error relating to the WIA driver 153 in the error log 156. Accordingly, the CPU 11 can surely store, in the error log 156, a record of an error relating to the WIA driver 153 even if an error occurs when the scanner 50 is controlled in S42 and if the computer 10 is in a state of not receiving input. In other words, the information about the error stored in S41 indicates the error to be occurred in S42. That is, the information about the error is stored in advance. The error stored in S41 in the error log 156 saved even if the error occurred during the control of the scanner in S42 so that the computer 10 cannot continue the scanning executing process anymore. Thus, the error log 156 correctly stores that the error has occurred during the control of the scanner via the WIA driver 153. As described later, if the error does not occur during the control of the scanner in S42, in S46 information about the error stored in S41 is deleted.

In S44, the CPU 11 determines whether a fatal error has occurred during the control of the scanner 50 via the WIA driver 153 based on conditions same as those in the determination in S34. That is, the CPU 11 determines whether an error has occurred during the control of the scanner 50 by the WIA driver 153. If an error has occurred, the CPU 11 determines whether the error has occurred due to any of nonexistence of document paper, paper jam of a document, pulling out of a cable, power of a scanner being turned off, incorrect network setting of a scanner or a computer, and disconnection with destination equipment through a cable. Then, if the error does not fall within any of the above, the CPU 11 determines that the error is a fatal error which cannot be easily resolved by the user.

When the CPU 11 determines that a fatal error has not occurred as a result of determination (S44: No), in S46 the CPU 11 deletes, from the error log 156, the error stored at the step S41 which precedes to the start of the control of the scanner 50 by the WIA driver 153. Subsequently, the CPU 11 ends the process.

On the other hand, when the CPU 11 determines that a fatal error has occurred (S44: Yes), in S48 the CPU 11 writes detailed error information such as occurrence time of the error in addition to information about the error written in the error log 156 in the step S41. Subsequently, the CPU 11 ends the scanning execution process.

As described above, if an error relating to the WIA driver 153 is not stored in the error log 156, the CPU 11 controls the scanner 50 via the WIA driver 153. Subsequently, if an error has occurred during the control of the scanner 50 by the WIA driver 153, the CPU 11 stores information about the error in the error log 156, and ends the scanning execution process. If the error has occurred during the control of the scanner 50 via the WIA driver 153, the CPU 11 may control the LCD 16 to display a message indicating that the control of the scanner 50 ends with failure.

Next, when the CPU 11 determines that an error with respect to the TWAIN driver 152 is stored in the error log 156 (S28: Yes), and that information about an error with respect to the WIA driver 153 is stored in the error log 156 (S40: Yes) as well, in S52 the CPU 11 selects the TWAIN driver 152, and the CPU 11 controls the scanner 50 via the TWAIN driver 152.

In this manner, even if information about errors is stored with respect to both the TWAIN driver 152 and the WIA driver 153 in the error log 156, the CPU 11 can try the control of the scanner 50.

Before step S52 which starts the control of the scanner 50, in S51 the CPU 11 writes information about an error relating to the TWAIN driver 152 in the error log 156. In other words, the information about the error stored in S51 indicates the error to be occurred in S52. That is, the information about the error is stored in advance. The error stored in S51 in the error log 156 saved even if the error occurred during the control of the scanner in S52 so that the computer 10 cannot continue the scanning executing process anymore. Thus, the error log 156 correctly stores that the error has occurred during the control of the scanner via the TWAIN driver 152. As described later, if the error does not occur during the control of the scanner in S51, in S56 information about the error stored in S52 is deleted.

In S54 the CPU 11 determines whether a fatal error has occurred during the control of the scanner 50 via the TWAIN driver 152 based on conditions same as those in the determination in S34. That is, the CPU 11 determines whether an error has occurred during the control of the scanner 50 by the TWAIN driver 152. If an error has occurred, the CPU 11 determines whether the error has occurred due to any of nonexistence of document paper, paper jam of a document, pulling out of a cable, power of a scanner being turned off, incorrect network setting of a scanner or a computer, and disconnection with destination equipment through a cable.

Then, if the error does not fall within any of the above, the CPU 11 determines that the error is a fatal error which cannot be easily resolved by the user.

When the CPU 11 determines that a fatal error has not occurred as a result of determination (S54: No), in S56 the CPU 11 deletes, from the error log 156, all the errors relating to the TWAIN driver 152 and the WIA driver 153. Subsequently, the CPU 11 ends the process. In this manner, a state in which either of the TWAIN driver 152 and the WIA driver 153 can be selected in the scanning execution process from a next scanning execution process.

On the other hand, when the CPU 11 determines that a fatal error have occurred (S54: Yes), in S58 the CPU 11 writes detailed error information such as occurrence time of the error in addition to the error written in the error log 156 in the step S51 which precedes to the start of the control of the scanner 50. Subsequently, the CPU 11 ends the scanning execution process. In this case, the CPU 11 may control the LCD 16 to display a message indicating that the control of the scanner 50 ends with failure.

According to the scanning execution process executed by the scanner application 154 of the embodiment, one driver is selected from a plurality of drivers based on an error stored in the error log 156. The CPU 11 controls the scanner 50 via the selected driver. Thus, if there is a plurality of drivers for controlling the scanner 50, an appropriate driver is selected automatically, and work of the user can be reduced.

In particular, according to the scanning execution process executed by the scanner application 154 of the present embodiment, a more appropriate driver can be automatically selected from the TWAIN driver 152 and the WIA driver 153 provided for controlling the scanner 50.

In addition, the scanning execution process (S21) of the embodiment, if the scanning start instruction is received from the scanner 50, the CPU 11 selects one of the TWAIN driver 152 and the WIA driver 153 and controls the scanner 50 via the selected driver. Thus, even if the user instructs starting of scanning on the scanner 50 side, an appropriate driver is automatically selected on the computer 10 side. Accordingly, to select a driver, the user need not to move from the vicinity of the scanner 50 to a position where the computer 10.

While the invention has been described in detail with reference to the above embodiments thereof, it would be apparent to those skilled in the art that various changes and modifications may be made therein without departing from the spirit of the invention.

For example, in the scanning execution process of the embodiment, if a fatal error has not occurred, the CPU 11 deletes information about the error stored in the error log 156 (S36, S46, and S56). The CPU 11 may invalidate information about the error stored in the error log 156 instead of deleting information about the error from the error log 156. In this case, in the determination process S28, the CPU 11 determines whether information about the error, which is valid, with respect to the TWAIN driver 152 is stored in the error log 156, instead of determining whether information about the error with respect to the TWAIN driver 152 is stored in the error log 156. Further, in the determination process S40, the CPU 11 determines whether information about the error with respect to the WIA driver 153, which is valid, is stored in the error log 156, instead of determining whether information about the error with respect to the WIA driver 153 is stored in the error log 156.

In addition, in the embodiment described above, the scanner application 154 which controls the scanner 50 is explained as an example. The invention also applicable to an imaging application for controlling a digital camera, for example.

Further, in the embodiment described above, the TWAIN driver name and the WIA driver name of the scanner to be controlled are acquired from the registry 155. However, the invention is not limited to the above method for acquiring the driver name. For example, when a product name of a device to be controlled is included in a driver name, the CPU 11 may acquire, by searching, the driver name including the product name of the device to be controlled.

The CPU 11 may acquire, from the registry 155, a driver name of a driver corresponding to a scanner connected to a connection port to which the scanning start instruction is input.

In the embodiment described above, the scanner 50 is connected to the computer 10 via the LAN 60. However, the scanner to be controlled may be connected in other methods, such as a USB, an IEEE 1394, a parallel interface, and an infrared ray communication.

In the embodiment described above, the scanner control process explained with reference to FIG. 6 is executed in accordance with the scanning start receiving program 157, and the scanning execution process described with reference to FIG. 7 is executed by the scanner application 154. However, the scanner application 154 may execute both of the scanner control process and the scanning execution process.

Roles of the TWAIN driver 152 and the WIA driver 153 may be interchanged in the scanning execution process. That is, in the process S28 and successive process (S30, S34, S36, and S38), the WIA driver 153 may be used instead of the TWAIN driver 152, and in the process S40 and the successive process (S41, S42, S44, and S46), the TWAIN driver 152 may be used instead of the WIA driver 153.

What is claimed is:

1. An image processing method for controlling a computer and an image processing device connected to the computer to perform an image processing, the computer including a plurality of drivers that controls the image processing device, the image processing method comprising:
    (a) controlling the image processing device by using one of the plurality of drivers;
    (b) storing, in a storing unit, error information indicating which one of the plurality of drivers is used when an error occurs in the controlling step (a);
    (c) accessing the error information stored in the storing step (b);
    (d) selecting a subject driver from the plurality of drivers based on the error information accessed in the accessing step (c);
    (e) controlling the image processing device via the subject driver selected in the selecting step (d);
    (f) reading a correspondence relation between the image processing device and one of the plurality of drivers;
    (g) selecting at least two drivers corresponding to the image processing device among the plurality of drivers based on the correspondence relation read in the reading step (f);
    wherein the selecting step (d) selects the subject driver from the at least two drivers selected in the selecting step (g);
    wherein the plurality of drivers includes a first driver which controls the image processing device and which complies with a first standard, and a second driver which controls the image processing device and which complies with a second standard different from the first standard, the first driver and the second driver are selected in the selecting step (g), the image processing method further comprising:
(h) determining whether the error information about the first driver is available,
wherein the selecting step (d) comprises:
(i) selecting the first driver as the subject driver when the determining step (h) determines that the error information about the first driver is unavailable.

2. The image processing method as claimed in claim 1, wherein the computer is installed with an operating system,
wherein each of the plurality of drivers controls the image processing device by communicating with the operating system.

3. The image processing method as claimed in claim 1, further comprising:
(j) determining whether the error information about the second driver is available,
wherein the selecting step (d) comprises:
(k) selecting the second driver as the subject driver when the determining step (h) determines that the error information about the first driver is available and when the determining step (j) determines that the error information about the second driver is unavailable.

4. The image processing method as claimed in claim 1, further comprising:
(l) determining whether a prescribed error occurs when the controlling step (e) controls the image processing device via the first driver; and
(m) determining whether the error information about the second driver is available;
wherein the selecting step (d) comprises:
(n) selecting the second driver as the subject driver when the determining step (l) determines that the prescribed error occurs when the controlling step (e) controls the image processing device via the first driver, and when the determining step (m) determines that the error information about the second driver is unavailable.

5. The image processing method as claimed in claim 1, further comprising:
(o) determining whether the error information about the second driver is available,
wherein the selecting step (d) comprises:
(p) selecting the first driver as the subject driver when the determining step (h) determines that the error information about the first driver is available and when the determining step (o) determines that the error information about the second driver is available.

6. The image processing method as claimed in claim 5, further comprising:
(q) determining whether a prescribed error occurs when the controlling step (e) controls the image processing device via the first driver which is selected in the selecting step (d) as the subject driver when the determining step (h) determines that the error information about the first driver is available and when the determining step (o) determines that the error information about the second driver is available; and
(r) deleting both the error information about the first driver and the error information about the second driver when the determining step (q) determines that the prescribed error does not occur when the controlling step (e) controls the image processing device via the first driver.

7. The image processing method as claimed in claim 1, further comprising:
(s) storing the error information about the subject driver selected in the selecting step (d) in the storing unit before the controlling step (e) controls the image processing device via the subject driver selected in the selecting step (d); and
(t) deleting the error information about the subject driver selected in the selecting step (d) from the storing unit when a prescribed error does not occur when the controlling step (e) controls the image processing device via the subject driver selected in the selecting step (d).

8. The image processing method as claimed in claim 1, further comprising:
(u) receiving an instruction from the image processing device,
wherein the selecting step (d) selects one of the first driver and the second driver, as the subject driver, when the receiving step (u) receives the instruction.

9. The image processing method as claimed in claim 1, wherein the first standard corresponds to TWAIN, and the second standard corresponds to WIA.

10. The image processing method as claimed in claim 1, wherein the first standard corresponds to WIA, and the second standard corresponds to TWAIN.

11. A non-transitory computer-readable storage medium storing a set of program instructions executable on a computer to control an image processing device that is connected to the computer, the computer including a plurality of drivers that controls the image processing device, the program instructions comprising:
(a) controlling the image processing device by using one of the plurality of drivers;
(b) storing, in a storing unit, error information indicating which one of the plurality of drivers is used when an error occurs in the controlling step (a);
(c) accessing the error information stored in the storing step (b);
(d) selecting a subject driver from the plurality of drivers based on the error information accessed in the accessing step (c); and
(e) controlling the image processing device via the subject driver selected in the selecting step (d);
(f) reading a correspondence relation between the image processing device and one of the plurality of drivers;
(g) selecting at least two drivers corresponding to the image processing device among the plurality of drivers based on the correspondence relation read in the reading step (f);
wherein the selecting step (d) selects the subject driver from the at least two drivers selected in the selecting step (g);
wherein the plurality of drivers includes a first driver which controls the image processing device and which complies with a first standard, and a second driver which controls the image processing device and which complies with a second standard different from the first standard, the first driver and the second driver are selected in the selecting step (g),
the image processing device further controlled by:
(h) determining whether the error information about the first driver is available,
wherein the selecting step (d) comprises:
(i) selecting the first driver as the subject driver when the determining step (h) determines that the error information about the first driver is unavailable.

12. The non-transitory computer-readable storage medium as claimed in claim 11, wherein the computer is installed with an operating system, wherein each of the plurality of drivers controls the image processing device by communicating with the operating system.

13. The non-transitory computer-readable storage medium as claimed in claim 11, further comprising:
  - (j) determining whether the error information about the second driver is available, wherein the selecting step (d) comprises:
  - (k) selecting the second driver as the subject driver when the determining step (h) determines that the error information about the first driver is available and when the determining step (j) determines that the error information about the second driver is unavailable.

14. The non-transitory computer-readable storage medium as claimed in claim 11, further comprising:
  - (l) determining whether a prescribed error occurs when the controlling step (e) controls the image processing device via the first driver; and
  - (m) determining whether the error information about the second driver is available; wherein the selecting step (d) comprises:
  - (n) selecting the second driver as the subject driver when the determining step (l) determines that the prescribed error occurs when the controlling step (e) controls the image processing device via the first driver, and when the determining step (m) determines that the error information about the second driver is unavailable.

15. The non-transitory computer-readable storage medium as claimed in claim 11, further comprising:
  - (o) determining whether the error information about the second driver is available, wherein the selecting step (d) comprises:
  - (p) selecting the first driver as the subject driver when the determining step (h) determines that the error information about the first driver is available and when the determining step (o) determines that the error information about the second driver is available.

16. The non-transitory computer-readable storage medium as claimed in claim 15, further comprising:
  - (q) determining whether a prescribed error occurs when the controlling step (e) controls the image processing device via the first driver which is selected in the selecting step (d) as the subject driver when the determining step (h) determines that the error information about the first driver is available and when the determining step (o) determines that the error information about the second driver is available; and
  - (r) deleting both the error information about the first driver and the error information about the second driver when the determining step (q) determines that the prescribed error does not occur when the controlling step (e) controls the image processing device via the first driver.

17. The non-transitory computer-readable storage medium as claimed in claim 11, further comprising:
  - (s) storing the error information about the subject driver selected in the selecting step (d) in the storing unit before the controlling step (e) controls the image processing device via the subject driver selected in the selecting step (d); and
  - (t) deleting the error information about the subject driver selected in the selecting step (d) from the storing unit when a prescribed error does not occur when the controlling step (e) controls the image processing device via the subject driver selected in the selecting step (d).

18. The non-transitory computer-readable storage medium as claimed in claim 11, further comprising:
  - (u) receiving an instruction from the image processing device,
  - wherein the selecting step (d) selects one of the first driver and the second driver, as the subject driver, when the receiving step (u) receives the instruction.

19. The non-transitory computer-readable storage medium as claimed in claim 11, wherein the first standard corresponds to TWAIN, and the second standard corresponds to WIA.

20. The non-transitory computer-readable storage medium as claimed in claim 11, wherein the first standard corresponds to WIA, and the second standard corresponds to TWAIN.

* * * * *